United States Patent
Elbhar et al.

(10) Patent No.: US 10,106,041 B2
(45) Date of Patent: Oct. 23, 2018

(54) ELECTRICAL OR ELECTRONIC DEVICE WITH TWO SUPPLY VOLTAGES

(71) Applicant: Valeo Systemes Thermiques, Le Mesnil Saint Denis (FR)

(72) Inventors: Thierry Elbhar, Les Bréviaires (FR); Jonathan Fournier, Le Perray-en-Yvelines (FR); Bertrand Puzenat, Montigny-le-Bretonneux (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 258 days.

(21) Appl. No.: 15/028,222

(22) PCT Filed: Oct. 6, 2014

(86) PCT No.: PCT/EP2014/071351
§ 371 (c)(1),
(2) Date: Apr. 8, 2016

(87) PCT Pub. No.: WO2015/052137
PCT Pub. Date: Apr. 16, 2015

(65) Prior Publication Data
US 2016/0264004 A1    Sep. 15, 2016

(30) Foreign Application Priority Data
Oct. 10, 2013 (FR) ..................... 13 59828

(51) Int. Cl.
*B60L 11/04* (2006.01)
*B60L 3/04* (2006.01)
(Continued)

(52) U.S. Cl.
CPC ............... *B60L 11/04* (2013.01); *B60L 1/00* (2013.01); *B60L 3/0069* (2013.01); *B60L 3/04* (2013.01);
(Continued)

(58) Field of Classification Search
CPC ....................................... B60L 11/04
(Continued)

(56) References Cited

U.S. PATENT DOCUMENTS 9,300,127 B2 *    3/2016    Kim ............... H02H 3/16

FOREIGN PATENT DOCUMENTS

DE    102 32 941 A1    2/2004
WO    2012/131235 A2    10/2012

OTHER PUBLICATIONS

International Search Report issued in PCT/EP2014/071351 dated Mar. 2, 2015 (2 pages).
(Continued)

*Primary Examiner* — Joseph Chang
(74) *Attorney, Agent, or Firm* — Osha Liang LLP

(57) ABSTRACT

An electrical or electronic device (7) capable of being supplied with two different values of voltage from respectively a first electrical network (3) and from a second electrical network (8), comprises: a first connecting interface (70) capable of being linked, under normal connection conditions, with a ground conductor (GND_12) and a voltage conductor of the first electrical network (3); a second connecting interface (71) capable of being linked, under normal connection conditions, with the ground conductor (GND_48) and a voltage conductor of the second electrical network (8); the ground connections of the two connecting interfaces (70, 71) being linked together to form a common ground; and at least one switch module (74; 75) interposed in series on the common ground, the switch module being capable of switching into an open position following a modification in the connection conditions of the first or second interface.

7 Claims, 2 Drawing Sheets

(51) Int. Cl.
| | |
|---|---|
| *H02H 3/16* | (2006.01) |
| *B60L 1/00* | (2006.01) |
| *B60L 3/00* | (2006.01) |
| *B60L 11/18* | (2006.01) |
| *H02J 1/10* | (2006.01) |
| *H02J 1/00* | (2006.01) |

(52) U.S. Cl.
CPC ............ *B60L 11/1868* (2013.01); *H02H 3/16* (2013.01); *H02J 1/00* (2013.01); *H02J 1/108* (2013.01); *H02J 2001/008* (2013.01); *Y02T 10/7005* (2013.01); *Y02T 10/7066* (2013.01)

(58) Field of Classification Search
USPC .......................................................... 307/80
See application file for complete search history.

(56) References Cited

OTHER PUBLICATIONS

Written Opinion of the International Searching Authority issued in PCT/EP2014/071351 dated Mar. 2, 2015 (9 pages).

\* cited by examiner

ELECTRICAL OR ELECTRONIC DEVICE WITH TWO SUPPLY VOLTAGES

The present invention relates to the electrical or electronic devices that require two distinct power supply voltages.

The invention relates in particular, although not exclusively, to the field of motorized vehicles in which some equipment items have to be designed to operate with two power supply voltages of distinct values, typically a low voltage of the order of 12 volts, and a medium voltage of the order of 48 volts.

For these types of equipment items, a specification notably defining certain architecture rules and validation tests is currently being developed by a consortium of automobile constructors. This specification ("Electrical and Electronic components in the vehicle 48 V—vehicle electrical system, Requirement and tests", specification 148 dated Aug. 29, 2011) requires in particular:

- that any 12 volt/48 volt equipment item should have a common ground, and include a 12 volt connector interface to allow it to be connected to the 12 volt vehicle network, and a 48 volt connector interface to allow it to be connected to the 48 volt vehicle network, each connector interface having its own ground connection;
- that any 12 volt/48 volt equipment item should satisfy a leakage current measurement test, so as to guarantee that the 48 volt and 12 volt power supplies are well protected against these leakage currents;
- that any 12 volt/48 volt equipment item should satisfy a test of loss of the ground cable of the 48 volt network, so as to guarantee that the ground cable of the 12 volt network does not risk being damaged following a fault in the ground cable of the 48 volt network.

Figure 1:
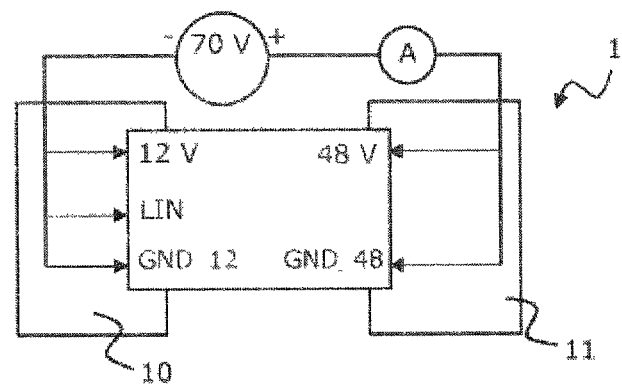

FIG. 1 schematically illustrates the set up produced for the validation test relating to the leakage currents of an electrical or electronic device 1 comprising a first connector interface 10 for the 12 volts, and a second connector interface 11 for the 48 volts. This test consists in connecting all the inputs/outputs of the first connector interface 10 to a first terminal of a DC voltage generator, in connecting the inputs of the second connector interface 11 to the second terminal of the DC voltage generator, in applying a voltage of 70 volts by means of the DC voltage generator, and in measuring the current using a conventional ammeter. The electrical or electronic device 1 is validated if, in this test, the measured current remains less than or equal to 1 microampere (as an absolute value).

The second test of loss of ground consists in connecting the electrical or electronic device between two 12 volt and 48 volt power supplies, in simulating the loss of the ground cable on the 48 volt side and in observing any damage on the ground cable on the 12 volt side. The electrical or electronic device 1 is validated if, in this test, no damage is observed at the end of a time of approximately 30 minutes.

Figure 2:
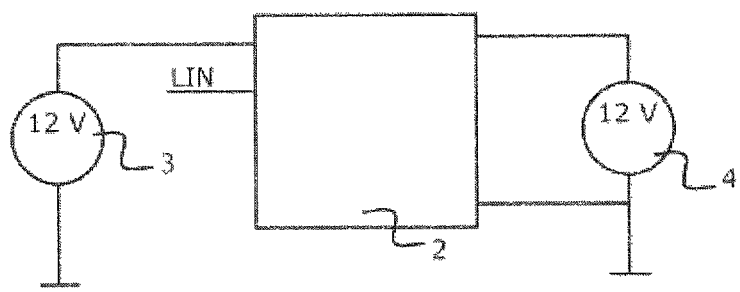

Architectures of electrical or electronic devices likely to operate with two power supply voltages are already known. FIG. 2 schematically illustrates, in particular, an additional heater module 2 which uses, for its power supply, two 12 volt voltages, one with low power, represented by the voltage generator 3, the other with a higher power, typically of the order of 1000 to 1200 watts, represented by the voltage generator 4. Such an additional heater is used on starting up a motor vehicle to more rapidly heat up the interior. The power supply with low power 3 is used for the management and the interface of the module 2 whereas the power supply with higher power 4 is used to supply the heating resistors (not represented) contained in the module. As can be seen in the architecture of FIG. 2, only the ground of the voltage generator 4 is connected to the module. Furthermore, the data input LIN of the module is supplied by the voltage generator 3 and the ground of the generator 4. Such an architecture could not therefore be used for a 12 volt/48 volt device conforming to the specification cited above which demands two distinct grounds for each power supply network. Furthermore, the loss of the ground cable of the generator 4 means that the module 2 can no longer communicate over its data input LIN.

Figure 3:
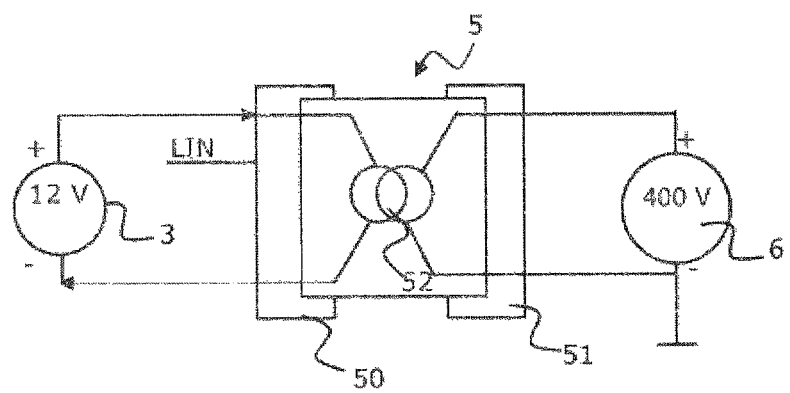

FIG. 3 schematically represents another known architecture of an electrical or electronic device 5 used in electric motor vehicles. Here, the device 5 is supplied, through two connector interfaces 50 and 51, with two very different voltages, a low first voltage of the order of 12 volts, represented by the voltage generator 3, and a very high second voltage, of the order of 400 volts, represented by the voltage generator 6. For safety purposes, this type of device 5 must necessarily include an isolating transformer 52 in order to create a galvanic insulation between the 12 volt power supply and the 400 volt power supply.

A similar architecture could be used to produce a 12 volt/48 volt electrical or electronic device compatible with the aforementioned specification. Nevertheless, this solution is costly and bulky, because of the use of an isolating transformer, and remains complex to implement.

The aim of the invention is to mitigate the above drawbacks by proposing a simple architecture of an electrical or electronic device with two power supply voltages, for example 12 volts/48 volts, which meets the requirements of the specification with respect to the presence of two ground terminals, and which makes it possible to satisfy at least one of the two abovementioned tests.

The present invention meets this objective by proposing an electrical or electronic device suitable for being supplied, in operation, with a first voltage value generated by a first electrical network and with a second voltage value higher than the first voltage value and generated by a second electrical network, the device comprising:

- a first connector interface suitable for being connected, under standard link conditions, to a ground conductor and a voltage conductor of the first electrical network;
- a second connector interface suitable for being connected, under said standard link conditions, to a ground conductor and a voltage conductor of the second electrical network;
- each connector interface comprising a ground connection, and the ground connections of the two connector interfaces being connected together to form a common ground; and
- at least one switch module inserted in series on the common ground, the switch module being able to switch to an open position following a modification of the link conditions of the first or the second interface.

Standard link conditions should be understood to mean the links necessary to the normal operation of the device, that is to say the usual connections of the connector interfaces to the two electrical networks.

According to other particularly advantageous possible features:

- the switch module can be able to switch to an open position in case of loss of the ground conductor of the second electrical network;
- the switch module can, in this case, comprise a positive coefficient resistor in series on the common ground;

as a variant, the switch module comprises a transistor controlled by a current measurement circuit suitable for measuring the current circulating on the common ground;

the switch module can be able to switch to an open position when all the inputs/outputs of the first connector interface are connected together;

the switch module can comprise, in this case, a MOSFET transistor supplied with voltage by the first electrical network;

the switch module is associated with a non-return diode suitable for preventing any current from circulating toward the first connector interface when the switch module is in the open position.

Figure 4:
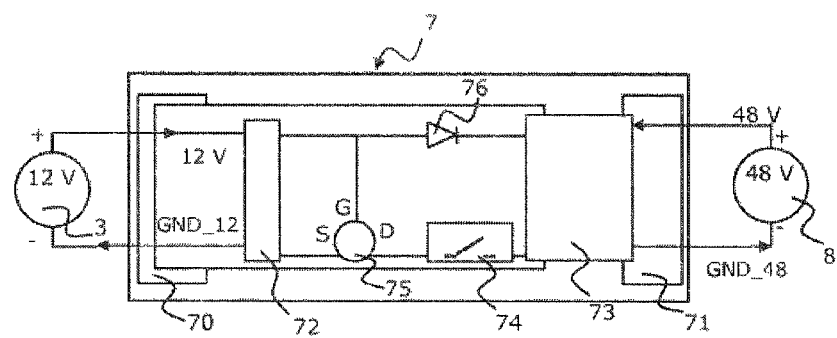

The invention and the advantages that it brings will be better understood in light of the following description of a nonlimiting exemplary implementation of the invention, given with reference to the attached figures, in which:

FIG. 1, already described above, schematically represents the equivalent electrical circuit for a leakage current measurement test for a 12 volt/48 volt device prescribed by the abovementioned specification 148;

FIG. 2, already described above, schematically illustrates a known architecture for a device using two 12 volt power supply voltages;

FIG. 3, already described above, schematically illustrates a known architecture for a device using a 12 volt power supply voltage and a 400 volt power supply voltage;

FIG. 4 schematically illustrates an exemplary architecture of an electrical or electronic device with two supply voltages, for example 12 volts/48 volts, conforming to the present invention.

FIG. 4 represents an electrical or electronic device 7 according to a possible embodiment of the invention, in the nonlimiting context of a dual 12 volt/48 volt power supply. This device 7 is represented in its conditions of use, that is to say receiving a first power supply voltage of 12 volts from a 12 volt first network (represented by a voltage generator 3), and a higher second power supply voltage, typically of the order of 48 volts, from a 48 volt second network (represented by a voltage generator 8). For this, the device 7 comprises:

a first connector interface 70 suitable for being connected to the two terminals of the voltage generator 3, that is to say, in practice, to the ground conductor GND_12 and to the 12 volt voltage conductor of the 12 volt first network;

a second connector interface 71 suitable for being connected to the two terminals of the voltage generator 8, that is to say, in practice, to the ground conductor GND_48 and to the 48 volt voltage conductor of the 48 volt second network.

Inside the device 7, the ground connections of the two connector interfaces 70 and 71 are connected together to form a common ground.

Between the two connector interfaces 70 and 71, the device 7 comprises, preferentially, an EMC (electromagnetic compatibility) filtering module 72 for eliminating possible voltage variations, and a 12 volt/48 volt interface module 73 which incorporates the functionalities specific to the device. For example, if the device 7 is an additional heater, the module 73 will comprise the management components and the interface as well as the heating resistors.

The device 7 further comprises a first switch module 74 inserted in series on the common ground connecting the two ground connections of the connector interfaces 70 and 71, this first switch module 74 being able to be controlled in a closed position as long as the current passing through it is lower than a threshold value of the order of approximately 200 mA, and to switch to the open position if the current passing through it passes above the threshold value.

This first switch module 74 can be produced by the association of a current measurement circuit, typically composed of an amplifier and a comparator, and a MOSFET transistor controlled to open the ground circuit as soon as the current measurement circuit detects a current higher than the threshold value.

As a variant, and preferentially, this switch module 74 will be composed of a resettable fuse, for example a positive temperature coefficient resistor, or PTC resistor, of infinite value if the current passing through the resistor is very much higher than the threshold value.

The presence of this first switch module 74 allows the device 7 to satisfy the test of the loss of the ground cable GND_48. In effect, if the ground cable GND_48 is cut, a high current will pass through the common ground and cause the switch 74 to open.

The device 7 further comprises a second switch module 75 also in series on the common ground, associated with a non-return diode 76. The second switch module is, for example, a MOSFET transistor supplied by the 12 volt network, that is to say whose source S and drain D are connected respectively to the ground connection of the connector module 70 and to the ground connection of the connector module 71, and whose gate G receives the 12 volt voltage. In normal operation, this MOSFET transistor is conventionally in the closed position, then its voltage $V_{GS}$ between the gate and the source is then equal to 12 volts. The diode 76 will, for its part, pass the current in the 12 volt direction to the 12 V/48 V interface module 73.

The benefit of this second switch module 75 is that it allows the device 7 to satisfy the leakage current measurement test. In effect, in performing this test (in accordance with the electrical circuit diagram of FIG. 1), all the inputs/outputs of the first connector interface 70 are connected together, such that the voltage $V_{GS}$ becomes nil, even by applying the voltage of 70 volts imposed by the test, and causes the transistor to switch to its open position. The non-return diode 76, for its part, guarantees that no current will be able to circulate in the other direction, that is to say from the second connector interface 71 to the first connector interface 70.

In light of the above, each of the two switch modules 74 and 75 described previously is able to switch to an open position following modification of the link conditions of the first or the second interface: in particular, for the leakage current measurement test, the connections of the connector interface 70 are modified relative to normal operation, hence the closure of the switch module 75. Similarly, the loss (disconnection or cable damage) of the ground cable GND_48 constitutes a modification of the normal link conditions of the second connector interface 71, resulting in the closure of the switch module 74.

The device 7 can of course comprise just one of these switch modules, without departing from the scope of the invention.

In all cases, the device obtained addresses various points required by the specification 148, while having a structure that is simple, inexpensive and of little bulk.

Although the invention has been described in the context of the 12 volt/48 volt application of the motor vehicle field, it can be of interest in all the cases where a device requires a dual power supply with so-called safe voltage values.

The invention claimed is:

1. An electrical or electronic device suitable for being supplied, in operation, with a first voltage value generated by a first electrical network and with a second voltage value higher than the first voltage value and generated by a second electrical network, the device comprising:
   a first connector interface suitable for being connected, under standard link conditions, to a ground conductor and a voltage conductor of the first electrical network;
   a second connector interface suitable for being connected, under said standard link conditions, to another ground conductor and a voltage conductor of the second electrical network;
   each connector interface comprising a ground connection, and the ground connections of the two connector interfaces being connected together to form a common ground; and
   at least one switch module inserted in series on the common ground, comprising a transistor controlled by a current measurement circuit for measuring the current circulating on the common ground, the at least one switch module being able to switch to an open position following a modification of the link conditions of the first or the second interface.

2. The device as claimed in claim 1, wherein said switch module is able to switch to an open position in case of loss of the another ground conductor of the second electrical network.

3. The device as claimed in claim 2, wherein said switch module comprises a positive coefficient resistor in series on the common ground.

4. The device as claimed in claim 1, wherein said switch module is able to switch to an open position when all the inputs/outputs of the first connector interface are connected together.

5. The device as claimed in claim 4, wherein said switch module comprises a MOSFET transistor supplied with voltage by the first electrical network.

6. The device as claimed in claim 4, wherein the switch module is associated with a non-return diode suitable for preventing any current from circulating toward the first connector interface when the switch module is in the open position.

7. The device as claimed in claim 1, wherein the first voltage value is 12 volts, and the second voltage value is 48 volts.

* * * * *